Jan. 16, 1968 R. GÖRIKE 3,364,315

ELECTRONIC APPLIANCE

Filed Jan. 2, 1964

INVENTOR.

RUDOLF GÖRIKE

BY

[signature]

ATTORNEY 3,364,315

ELECTRONIC APPLIANCE

Rudolf Görike, Vienna, Austria, assignor to Akustische u. Kino-Gerate Gesellschaft m.b.H., Vienna, Austria, a firm Filed Jan. 2, 1964, Ser. No. 335,077
Claims priority, application Austria, Jan. 25, 1963, A 617/63
8 Claims. (Cl. 179—115.5)

Figures 1A, 1B, 2A, 2B, 2C, 3A, 3B, 3C, 3D:
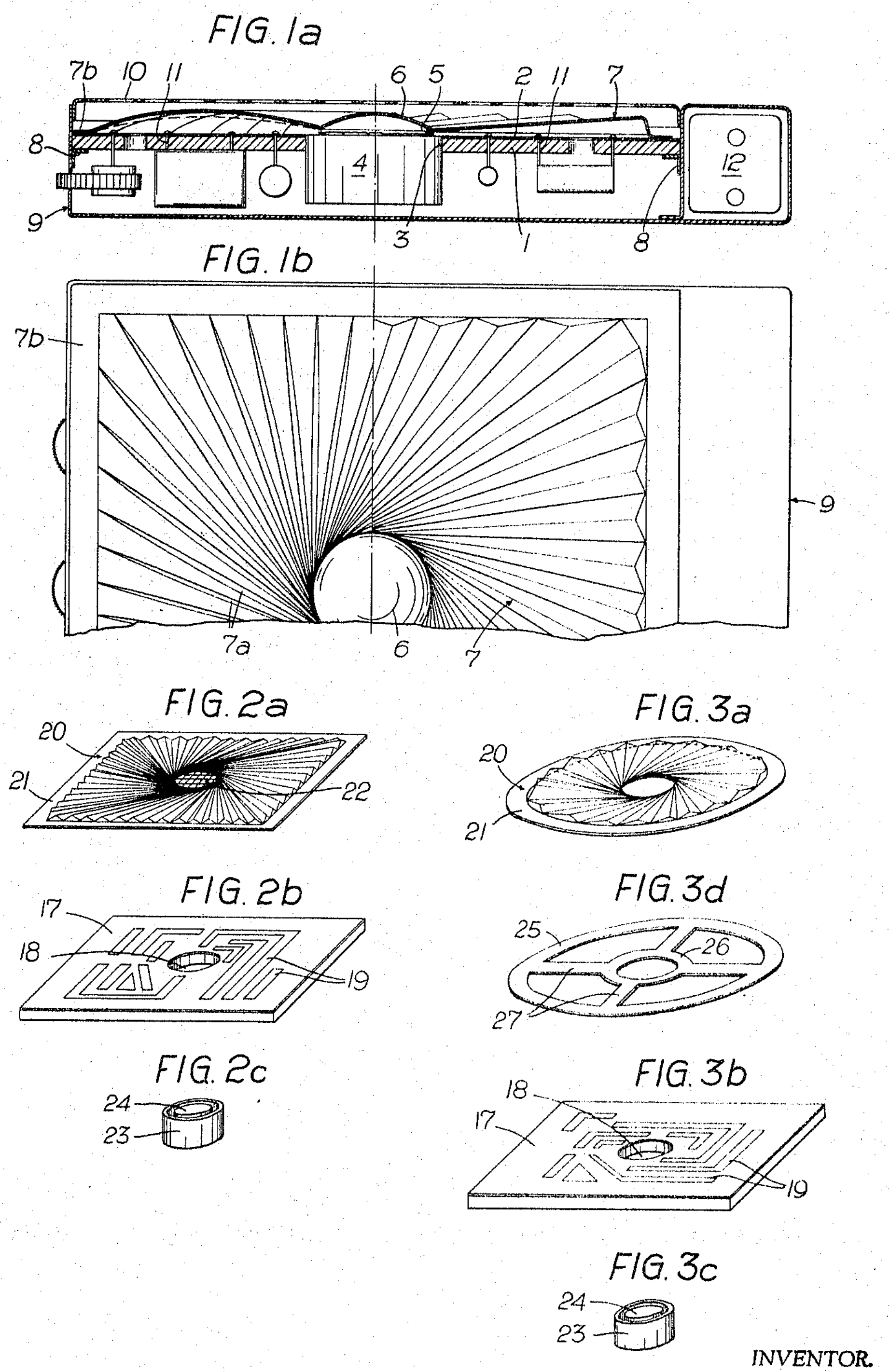

This invention relates to an electro-acoustic transducer, such as a loudspeaker of a microphone of any desired type, which is combined with an electronic appliance into a self-contained integral unit. The term electronic appliance is used to cover all appliances which can be used in conjunction with electro-acoustic transducers, for instance, amplifiers, radio receivers etc.

It is an object of the invention to provide a combination of this kind which occupies little space, has a light weight, and can easily be manufactured. Because components for electronic appliances are inherently designed for a minimum space requirement, the objects of the invention can only be achieved by the design of the support for the components and by their relative arrangement.

It is an object of the invention to design the other components, such as the electro-acoustic parts, so that they conform to the compact structure.

In transistorized appliances, the electro-acoustic transducer was previously designed to have a chassis of its own, which consisted in most cases of a sheet metal chassis frame to which the magnet system was fixed. The diaphragm was inserted within the chassis frame. In the manufacture of transistorized appliances combined with an electro-acoustic transducer, it was previously necessary to assemble the components one beside the other. The print plate constituted a separate element and was assembled beside the transducer in the housing of the appliance.

In contrast to this, the invention enables a design of a unit which is formed during the manufacture of the appliance and comprises the electro-acoustic transducer and the carrying plate to the transistorized appliance, which plate is provided with printed circuits. The carrying plate itself may form the chassis frame and holder for the diaphragm of the transducer. Alternatively, the diaphragm may be held by a separate chassis frame, which conforms to the carrying plate and may be of such a light weight that it ensures the holding and centering of the diaphragm during the manufacturing process whereas the stability is suitably provided for only by the carrying plate.

The diaphragm may consist of various materials. Suitable materials include metal (Duralumin), paper, synthetic thermoplastics, foamed plastics, consolidated woven fabric or a combination of synthetic thermoplastics and woven fabric.

According to the invention, a combination of the kind mentioned first hereinbefore is characterized by a substantially platelike chassis of insulating material, which is suitably provided at least on a portion of one of its surfaces with an electrically conducting layer, and to which an actuating system of the electro-acoustic transducer is preferably centrally attached and which is at least partly covered by a diaphragm of the electro-acoustic transducer, said chassis carrying also circuit components of the electronic appliance and constituting a substrate for printed circuitry.

Further features of the invention will become apparent from the following description of illustrative embodiments with reference to the accompanying drawings, in which:

FIGS. 1*a* and 1*b*, respectively, are a sectional view and a top plan view showing a combination of the invention, which includes a dynamic loudspeaker with a diaphragm, and an electronic appliance, such as a radio receiver.

FIGS. 2 and 3 show examples of the design of elements of the combination.

The embodiment shown in FIG. 1 and consisting of a sound transducer and a radio receiver has a basic structural element in the form of a rectangular or square plate 1, 2, such as is used for printed circuits. This chassis plate may consist, e.g., of two intimately bonded layers, namely, a layer 1 of insulating material and a shielding layer 2 of metal. The chassis plate may alternatively be integral and consist of insulating material.

The plate has a central opening 3, the cross-sectional shape of which conforms to a loudspeaker actuating system 4, which is fitted into this opening and secured in a suitable manner, for example, by means of a U-shaped mounting bracket, to one side, here the underside, of the chassis plate. The actuating system may be of the electro-dynamic type and protrudes in dependence on its size from the underside of the chassis plate whereas the actuating system will suitably be flush with the top face of the chassis plate. The actuating system, or magnetic reaction unit, includes a magnet and core assembly in combination with a voice coil and its carrier.

The carrier 5 for moving coil protrudes in usual manner from the top face of the actuating system and carries also in usual manner a central cover 6 and the diaphragm 7. The periphery of the diaphragm conforms to the periphery of the chassis plate and is rectangular or square and provided with a peripheral or marginal portion **7*b*, which lies on the loudspeaker when the same has been mounted on the chassis plate. The actual diaphragm surface may be planar or have outwardly curved or straight generatrices between that portion of the diaphragm which is fixed to the moving coil and the rim of the diaphragm. In the latter case, the diaphragm forms a shallow cone, which is open in the direction in which sound is emitted. A step is formed between the outer rim of this cone and the above-mentioned marginal portion. FIG. 1 shows both possibilities, on the left the curved generatrix and on the right the straight one. The diaphragm surface is suitably formed with channels 7*a***, which are approximately radial with respect to the outer periphery of the diaphragm and tangential to the inner periphery of the annular diaphragm.

The chassis plate is secured with supports 8 in a metallic housing 9, which may be open or closed on all sides and which covers in any case the underside of the chassis plate. The diaphragm 7 is covered, e.g., with a suitable metallic screen or a perforated metal plate 10 having a downturned rim. In the embodiment of FIG. 1, the chassis plate 1 carrying the diaphragm 7 is surrounded and engaged by the skirt of the housing 9.

Alternatively, the diaphragm may be circular and have no radial channels. In this case, the convex surface of the annular diaphragm consisting, e.g., of paper, may have circular channels in its marginal portion, as is usual in loudspeakers.

Space for mounting the components of the electronic circuitry is available on the side opposite to the diaphragm, in the present example on the underside of the plate 1, 2 around the actuating system of the loudspeaker. The electronic circuitry is shown only diagrammatically in the drawing. The electrical leads 11 and any inductors, capacitor plates etc. are printed on the free surface area of the insulating plate 1. Independent components, such as transistors (or tubes), capacitors etc. are directly soldered to the printed leads or to separate lugs, as is usual in this art. In the free space between the plates 1, 2 and the housing 9, or beside this space, primary cells 12, or storage batteries or rectifiers may be accommodated.

To modify the frequency response of the diaphragm of a sound transducer, it is usual to provide acoustic loading means acting on the diaphragm face, preferably on the rear face. These loading means may be provided on or in the chassis plate and may consist, e.g., of openings, which may be filled with acoustic friction elements, or of ducts leading into the open, or of closed or open cavities.

Terminals, such as clamping screws or soldering tags for cables leading to the outside are preferably provided also on the chassis plate. The cables extend outwardly through leadouts in the housing 9.

FIGS. 2 and 3 are exploded perspective views showing two embodiments of the three most important structural elements of the chassis assembly, namely, the diaphragm, the print plate, and the magnet unit.

Referring first to FIG. 2, the print plate 17 (FIG. 2*b*) is approximately square and has a circular central opening 18. The necessary connections, and capacitor plates, inductors (indicated at 19) are provided on the plate on its top face, which is visible in the drawing. The remaining circuit elements are secured to the underside of the plate and consist of prefabricated parts, which are connected into the circuit. The underside of the plate is not visible in the drawing and may be formed by a shielding layer of metal.

The diaphragm 20 (FIG. 2*a*) has a contour conforming to the contour of the print plate. The diaphragm is square and approximately coextensive with the print plate. The diaphragm is provided with a frame 21, which is fixed to the diaphragm, and has a central opening, to which the carrier for the moving coil is attached in known manner. This opening is covered by a central screen 22.

FIG. 2*c* is a diagrammatic showing of the usual pot-shaped magnet unit, which consists in known manner of a pot member 23 and an inserted core 24. The elements 23 and 24 define between them an annular gap, into or through which the moving coil extends.

These three main elements are assembled or secured together in the manner described above for the embodiment of FIG. 1. For instance, the magnet and coil actuating system may be provided with a flange or fixing angles screw-connected to the chassis plate.

In FIGS. 3*a*–3*c*, the same elements are shown as in FIGS. 2*a* to 2*c*, the only difference being that the diaphgram is circular. Reference may be made in this connection to the description of the preceding figure.

FIG. 3*d* shows a separate carrying ring or centering spider for the diaphragm. This ring assembly comprises two concentric annular portions 25, 26, which are connected, e.g., by four spider arms 27. The outside diameter of the outer annular portion 25 corresponds approximately to the diameter of the diaphragm 20. The inside diameter of the inner annular portion 26 is selected to enable this inner annular portion to be secured to the magnet unit (FIG. 3*c*) so that the latter supports the carrying ring. The annular peripheral portion 21 of the diaphragm 20 is secured to the outer annular portion 25 of the centering spider. The innermost portion of the diaphragm will be attached to the moving coil carrier (not shown) in the usual manner familiar to those skilled in the art. The diaphragm, carrying ring and magnet unit are preassembled so that the diaphragm can be perfectly centered with respect to the magnet unit. Then the entire electro-acoustic transducer is inserted into the print plate from above and anchored in it.

It will be understood that various modifications are possible within the scope of the invention. The chassis plate need not be entirely planar but may have a surface configuration which is suitable for the conditions under which the assembly is carried out. For instance, it may be formed with steps or humps. Alternatively, the chassis plate may consist of a hollow disc and accommodate sound ducts, chambers for accommodating individual parts etc.

A braced design is also conceivable. The magnetic reaction unit of the loudspeaker or microphone need not be countersunk. It may be applied to the chassis plate, particularly if the magnetic reaction unit is of the electromagnetic type and is operatively connected to the diaphragm by a rod, which may extend through a narrow, but oversize bore of the chassis plate. The shape of the diaphragm may also be varied in the usual manner. A smaller diaphragm may be used if a horn is provided.

In another modification, the chassis plate may carry a plurality of sound transducers, which have different sound radiating characteristics or are coupled to different amplifier channels. The chassis plate may be incorporated in housings of wood or plastic material. In this case, the design according to the invention enables the provision of appliances which are extremely flat and may be mounted like a picture on or in a wall of the room, in which sound is to be reproduced.

A separate battery box, which can easily be opened, may be laterally attached to the housing of the appliance so that the batteries are easily accessible, e.g., from the front, for a replacement.

What is claimed is:

1. A unitary electroacoustic transducer and electronic component chassis assembly comprising, a substantially flat chassis plate having an opening therein, said chassis plate comprising an insulating substrate having printed circuit components applied to one surface thereof, a diaphragm arranged so as to cover a major portion of said surface, a magnetic reaction unit secured to said diaphragm and mounted in said chassis opening so as to protrude beyond the surface of said chassis plate that is opposite to said one surface, and a flat centering member interposed between said diaphragm and said one surface of the chassis plate for centering said diaphragm about said magnetic reaction unit, said centering member being affixed to said one surface of the chassis plate and to said magnetic reaction unit and said diaphragm being affixed at its outer periphery to said centering member so as to cover same.

2. A unitary electroacoustic transducer and electronic component chassis assembly comprising, a substantially flat chassis plate having an opening therein, said chassis plate comprising an insulating substrate having printed circuit components applied to one surface thereof, a diaphragm including a flat annular frame portion about its outer periphery and arranged so as to cover a major portion of said surface, a magnetic reaction unit secured to said diaphragm and mounted in said chassis opening so as to protrude beyond the surface of said chassis plate that is opposite to said one surface, and a flat centering member having inner and outer coaxial annular members and interposed between said diaphragm and said one surface of the chassis plate for centering said diaphragm about said magnetic reaction unit, said outer annular member being affixed to said one surface of the chassis plate and said inner annular member being affixed to said magnetic reaction unit, the annular frame portion of said diaphragm being secured to said outer annular member.

3. A unitary electroacoustic transducer and electronic component chassis assembly comprising, a substantially flat chassis plate having an opening therein, said chassis plate comprising an insulating substrate having printed circuit components applied to one surface thereof, a diaphragm comprising a flat annular frame about its outer periphery and a centrally located circular aperture therein, said diaphragm being affixed at its outer periphery to said one surface of the chassis plate so as to cover a major portion thereof, said diaphragm further comprising a plurality of radial channels arranged to form a shallow cone facing away from said one surface of the chassis plate, and a magnetic reaction unit secured to said diaphragm and mounted in said chassis opening so as to protrude beyond the surface of said chassis plate that is opposite to said one surface.

4. A chassis assembly as claimed in claim 3 further comprising a layer of electrically conductive material overlying at least a portion of said opposite surface of said chassis plate.

5. A chassis assembly as claimed in claim 3 wherein said diaphragm channels are arranged to extend tangential to the periphery of said circular aperture.

6. A unitary electroacoustic transducer and electronic component chassis assembly comprising, a substantially flat chassis plate having an opening therein, said chassis plate comprising an insulating substrate having printed circuit components applied to one surface thereof, a diaphragm comprising a thin flat annular peripheral member surrounding said opening and a shallow cone-shaped surface comprising a plurality of channels extending radially inward from said annular member towards said opening, a magnetic reaction unit secured to said diaphragm and mounted in said chassis opening so as to protrude beyond the surface of said chassis plate that is opposite to said one surface, and a thin flat centering spider interposed between said diaphragm and said one surface of the chassis plate and including inner and outer integral coaxial annular portions interconnected by radial spider arms, the annular peripheral member of said diaphragm being secured to said outer annular portion of said spider, said outer annular portion being secured to said one surface of the chassis plate so that said diaphragm covers a major portion of said one surface and said inner annular portion being secured to said magnetic reaction unit thereby to center said diaphragm about said magnetic reaction unit.

7. An electric apparatus comprising a chassis plate having an opening therein, a flat annular centering member having inner and outer coaxial annular portions, a diaphragm comprising an annular peripheral portion secured to the outer annular portion of said centering member and a cone-shaped surface extending radially outward from said inner annular portion towards said outer annular portion of said centering member and including an annular step portion at said peripheral portion thereof, and a magnetic reaction unit mounted in said chassis opening so as to extend therethrough and secured to said inner annular portion of said centering member so as to center said diaphragm about said magnetic reaction unit.

8. In an electric appliance, a flat annular spider member having inner and outer coaxial annular portions interconnected by radial arms, a diaphragm having a flat annular peripheral member secured to the outer annular portion of said spider and a concave surface extending radially outward from said inner annular portion towards said outer annular portion of said spider and including an annular step portion interconnecting the outer periphery of said concave surface with said annular peripheral member.

References Cited

UNITED STATES PATENTS

| | | | |
|---|---|---|---|
| 2,468,727 | 6/1944 | Bauman | 325—352 |
| 2,502,853 | 4/1950 | Keddie | 181—32 |
| 2,581,967 | 1/1952 | Mitchell | 325—352 X |
| 2,838,607 | 6/1958 | Olson | 179—1 |
| 3,020,971 | 2/1962 | Cefaly | 181—32 X |
| 2,423,014 | 6/1947 | Gilman | 179—115.5 |

KATHLEEN H. CLAFFY, *Primary Examiner.*

A. A. McGILL, *Assistant Examiner.*